United States Patent
Hartmann et al.

(10) Patent No.: US 9,343,936 B2
(45) Date of Patent: May 17, 2016

(54) ROTOR FOR AN ELECTRIC MACHINE

(75) Inventors: Ulrich Hartmann, Berlin (DE); Christian Knop, Berlin (DE); Robert Schwengber, Lübben (DE); Gordon Trogisch, Strausberg (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 421 days.

(21) Appl. No.: 14/001,830

(22) PCT Filed: Feb. 21, 2012

(86) PCT No.: PCT/EP2012/052925
§ 371 (c)(1),
(2), (4) Date: Aug. 27, 2013

(87) PCT Pub. No.: WO2012/116908
PCT Pub. Date: Sep. 7, 2012

(65) Prior Publication Data
US 2013/0334923 A1 Dec. 19, 2013

(30) Foreign Application Priority Data
Feb. 28, 2011 (DE) .................. 10 2011 004 852

(51) Int. Cl.
*H02K 21/12* (2006.01)
*H02K 1/28* (2006.01)
*H02K 1/27* (2006.01)
*H02K 7/18* (2006.01)

(52) U.S. Cl.
CPC .................. *H02K 1/28* (2013.01); *H02K 1/278* (2013.01); *H02K 1/2786* (2013.01); *H02K 7/1838* (2013.01)

(58) Field of Classification Search
CPC ........ H02K 1/28; H02K 1/2786; H02K 1/278
USPC .......... 310/156.19, 156.22, 216.125–216.127
See application file for complete search history.

(56) References Cited

U.S. PATENT DOCUMENTS

| | | | |
|---|---|---|---|
| 5,914,552 A | 6/1999 | Hsu et al. | |
| 2006/0220483 A1* | 10/2006 | Jones | H02K 1/278 310/156.19 |
| 2006/0255679 A1* | 11/2006 | Dine | H02K 1/2773 310/156.55 |
| 2007/0001533 A1* | 1/2007 | Jansen | H02K 1/24 310/156.19 |
| 2007/0024141 A1* | 2/2007 | Drexlmaier | H02K 1/278 310/156.19 |
| 2007/0290564 A1 | 12/2007 | Clark | |
| 2008/0093945 A1* | 4/2008 | Gruenhagen | H02K 1/278 310/156.19 |
| 2010/0231085 A1 | 9/2010 | Ifrim et al. | |

FOREIGN PATENT DOCUMENTS

| | | |
|---|---|---|
| CH | 324041 A | 8/1957 |
| DE | 19713955 A1 | 10/1997 |
| DE | 19631768 A1 | 2/1998 |
| DE | 102006049825 A1 | 4/2008 |
| DE | 112008001246 T5 | 3/2010 |
| EP | 1922801 B1 | 10/2010 |
| GB | 2022324 A | 12/1979 |
| JP | 2002084692 A | 3/2002 |
| JP | 2006034024 A | 2/2006 |
| SU | 1206888 A1 | 1/1986 |

* cited by examiner

*Primary Examiner* — Thanh Lam
(74) *Attorney, Agent, or Firm* — Henry M. Feiereisen LLC

(57) ABSTRACT

A rotor for an electric machine has a rotor member extending circumferentially about the axis of rotation of the rotor, and a locking device in an axial end region of a guide to mount permanent magnets in the direction of the axis of rotation of the rotor. The locking device is retained on the rotor member in the radial direction and in the direction of rotation of the rotor by guides. The locking device has a movable movement element and is designed such that when the movement element is moved, the locking device is positively or non-positively connected to the rotor member.

14 Claims, 6 Drawing Sheets

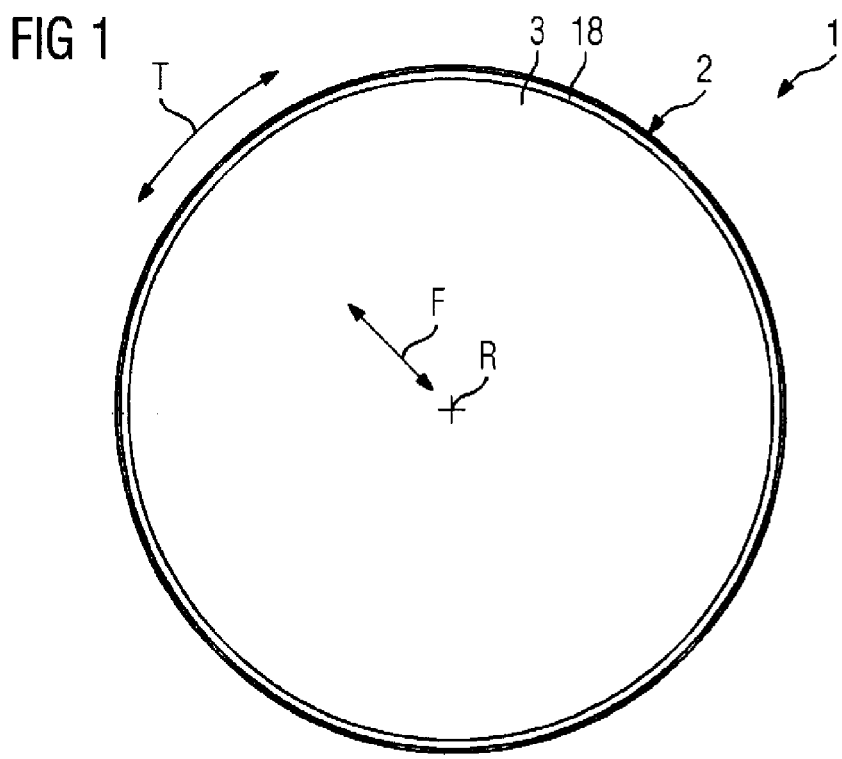
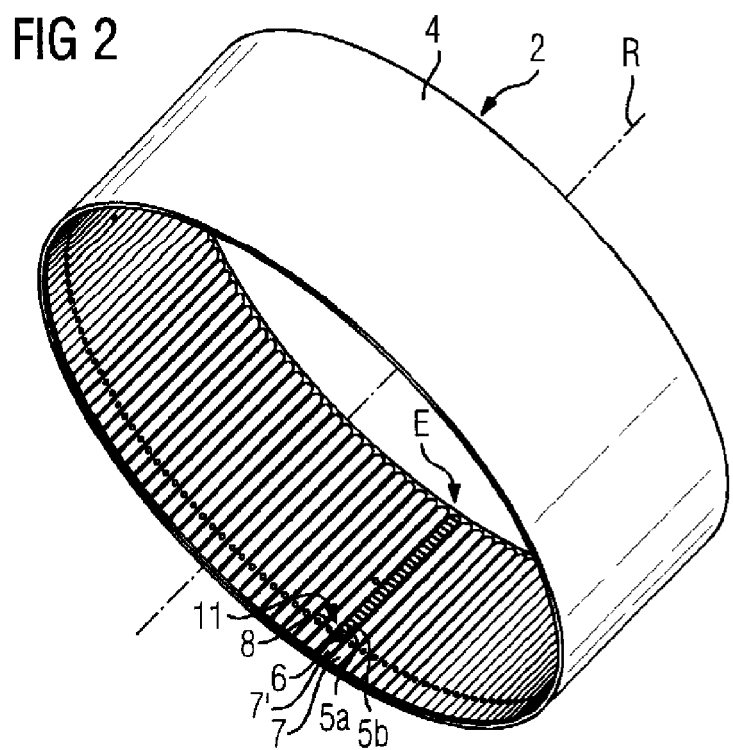

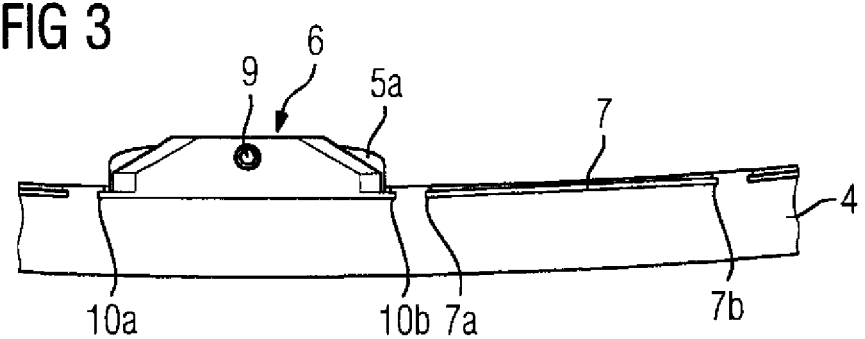
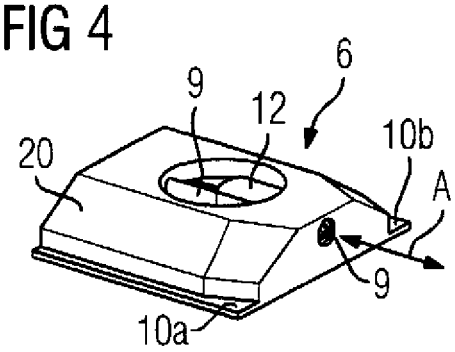
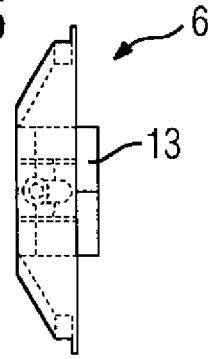
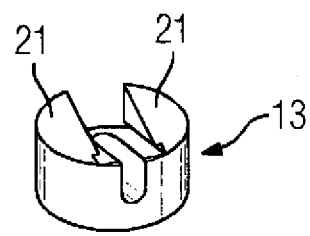
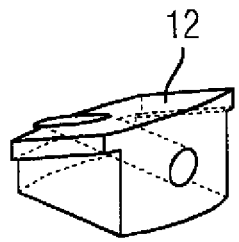

FIG 8
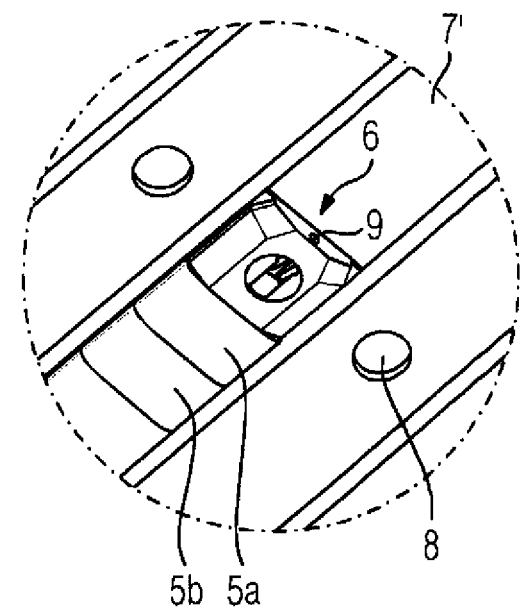
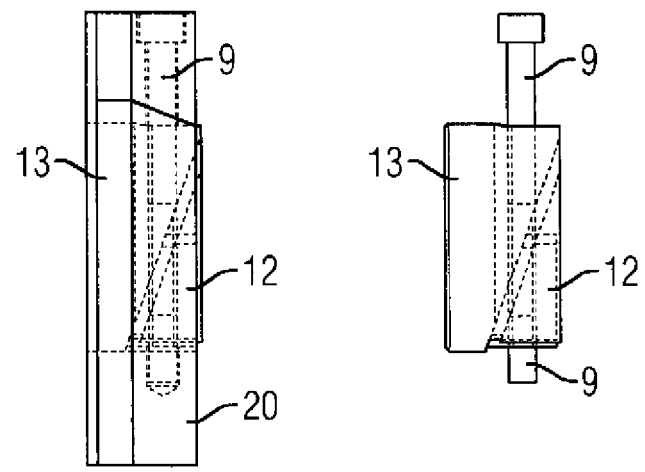
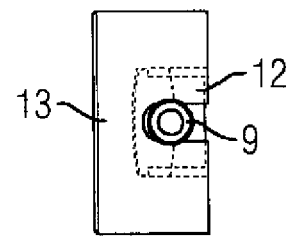

FIG 9
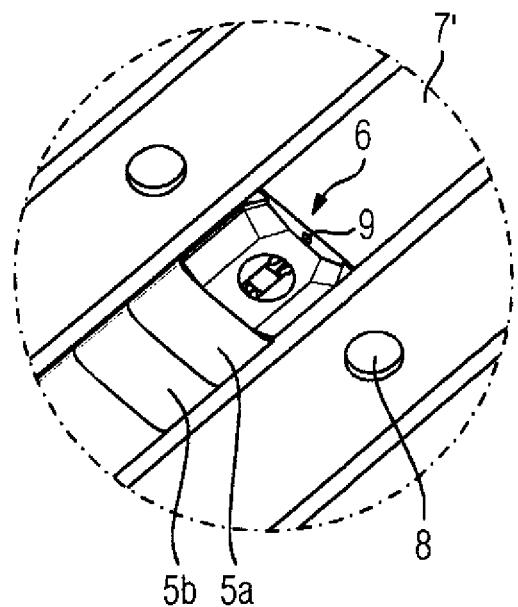
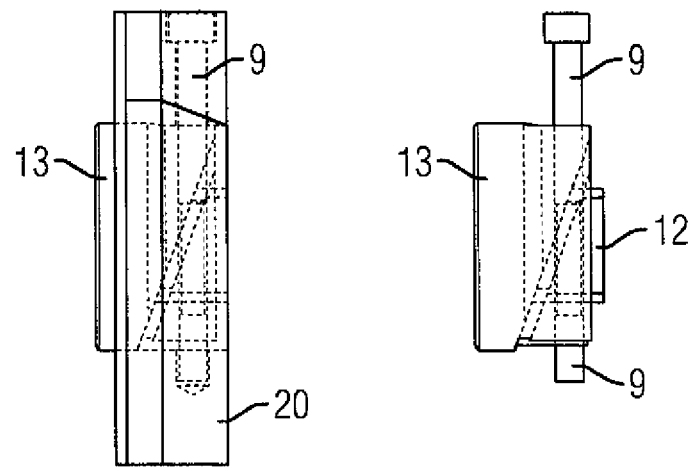
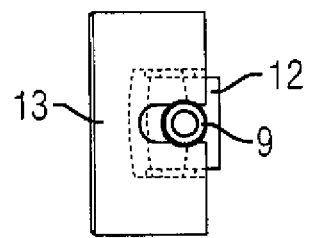

FIG 10
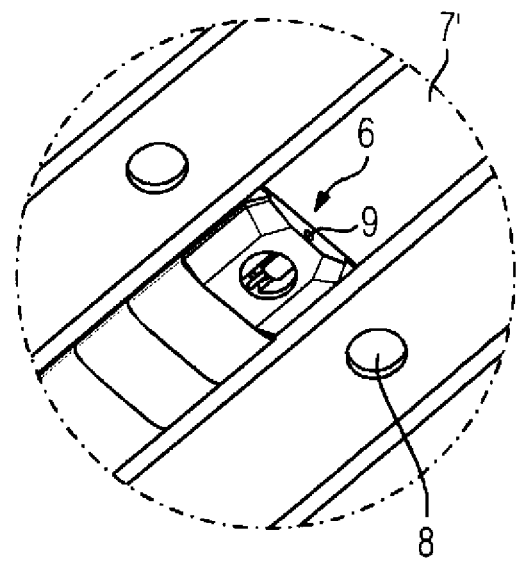
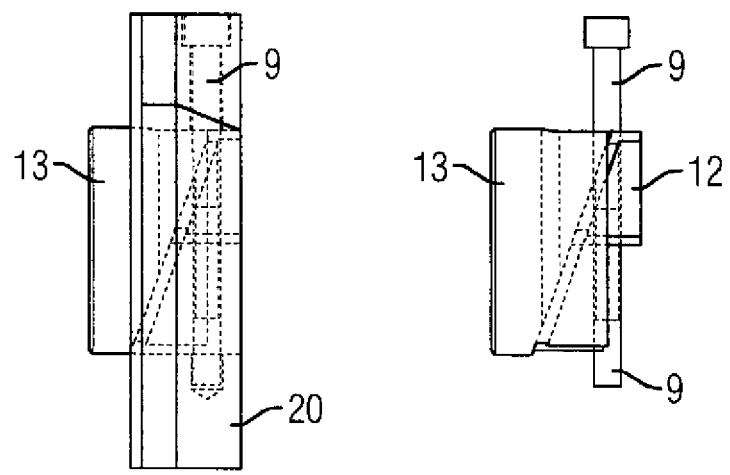
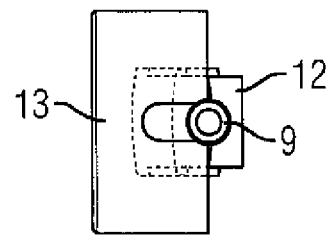

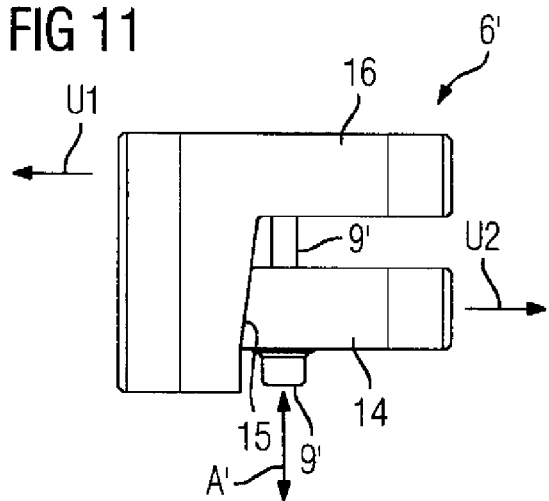
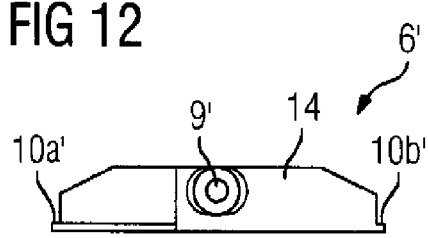
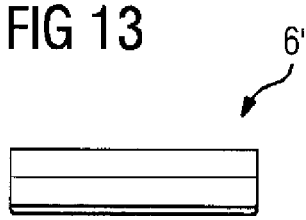
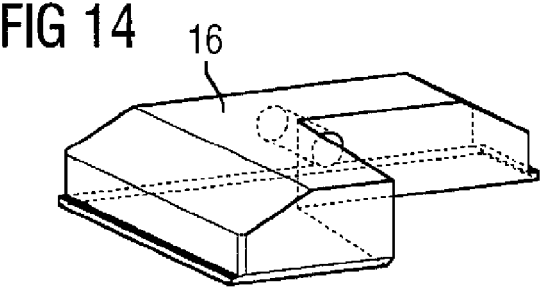
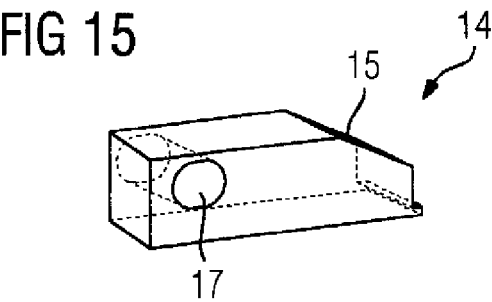

ROTOR FOR AN ELECTRIC MACHINE

CROSS-REFERENCES TO RELATED APPLICATIONS

This application is the U.S. National Stage of International Application No. PCT/EP2012/052925, filed Feb. 21, 2012, which designated the United States and has been published as International Publication No. WO 2012/116908 and which claims the priority of German Patent Application, Serial No. 10 2011 004 852.9, filed Feb. 28, 2011, pursuant to 35 U.S.C. 119(a)-(d).

BACKGROUND OF THE INVENTION

The invention relates to a rotor for an electric machine. In the case of electric machines, such as for example permanent-magnet excited electric generators or electric motors, in particular if the machines have a large electric power (greater than 1 MW), the affixing of the permanent magnets onto the rotor body of the rotor represents a major challenge for manufacturing technology. Up until now, the permanent magnets have been affixed on the rotor body using threaded connectors. However, these threaded connectors require a large number of bored holes passing through the rotor body in a radial direction. However, it is possible for particles of dirt or possibly even damaging liquids or gases to pass through these holes from the outside of the rotor body to the inside, or vice versa.

EP 1 922 801 B1 discloses a rotor for an electric motorized valve drive.

SUMMARY OF THE INVENTION

The object of the invention is to create a rotor for an electric machine, in which the permanent magnets are reliably held on the rotor body of the rotor and in which bored holes passing through the rotor body are no longer required for affixing the permanent magnets onto the rotor body.

This object is achieved by a rotor for an electric machine, wherein the rotor has a rotor body located around the axis of rotation of the rotor, wherein permanent magnets are arranged on the rotor body, wherein the rotor body has recesses running in the direction of the axis of rotation of the rotor, wherein the recesses are constructed in such a way that they form guides on the rotor body which run in the direction of the axis of rotation of the rotor, wherein the guides hold the permanent magnets on the rotor body in the radial direction and in the direction of rotation of the rotor wherein, for the purpose of fixing the permanent magnets in the direction of the axis of rotation of the rotor, the rotor has a locking fixture at an axial end region of each guide, wherein the guides hold the locking fixture on the rotor body in the radial direction and in the direction of rotation of the rotor, wherein the locking fixture has a movable moving element, wherein the locking fixture is constructed in such a way that if there is a movement of the moving element the locking fixture produces a positive or interference fit joint between the locking fixture and the rotor body.

Advantageous developments of the invention emerge from the dependent claims.

It has been found to be advantageous if the movable moving element is constructed as a rotary element which can be rotated, with the locking fixture being constructed in such a way that if there is a rotational movement of the rotary element the locking fixture establishes a positive or interference fit joint between the locking fixture and the rotor body. In this way it is possible to realize a locking fixture with a particularly simply construction.

It has further proven to be advantageous if the rotary element is embodied as a screw/bolt, because the rotary element is then of particularly simple construction.

It has further proven to be advantageous if, in the end region, in the axial direction, of each of the guides, the rotor body has an opening running in the rotor's radial direction, wherein the locking fixture has an interlocking element, wherein the locking fixture is constructed in such a way that, if there is a movement of the moving element, the interlocking element is moved into the opening and by such a means the positive joint is established. By this means, a locking fixture is created which can accommodate very large forces.

It has further proven to be advantageous if the displacement element is constructed with a wedge shape, wherein the movable moving element is constructed as a rotatable rotary element, wherein the locking fixture is constructed in such a way that when there is a rotational movement of the rotary element the displacement element is displaced in the axial direction of the rotary element against the interlocking element and, as a consequence of the displacement, the interlocking element is moved into the opening. By this means, a reliable locking fixture is created which is of particularly simple construction.

It has further proven to be advantageous if the locking fixture has a first basic element and a second basic element, wherein the locking fixture is constructed in such a way that when there is a movement of the moving element the first and second basic elements are pressed against the guide and in such a way an interference fit joint is produced. By this means, a locking fixture is created which is of particularly simple construction.

It has further proven to be advantageous if the second basic element has an angled side face, which makes a mechanical contact with the first basic element, wherein the movable moving element is constructed as a rotatable rotary element, wherein the locking fixture is constructed in such a way that when there is a rotational movement of the rotary element the second basic element is displaced in the axial direction of the rotary element and presses against the first basic element, wherein the first and the second basic elements are by this means displaced in opposite directions to each other in the direction of rotation of the rotor and are pressed against the guide. By this means, a locking fixture is created which is of particularly simple construction.

The electric machine is preferably constructed as an electric motor or generator, in particular as a wind turbine, and preferably has an electric power which is greater than 1 MW. The wind turbine can in particular be constructed as a direct-drive wind turbine.

BRIEF DESCRIPTION OF THE DRAWING

Exemplary embodiments of the invention are illustrated in the drawing and will be explained in more detail below. Shown here are:

FIG. 1 an electric machine in the form of a schematic diagram,

FIG. 2 a rotor for the electric machine, in accordance with the invention,

FIG. 3 a detailed view of the inventive rotor,

FIG. 4, 5 a first exemplary embodiment of a locking fixture,

FIG. 6 an interlocking element,

FIG. 7 a displacement element,

FIGS. 8, 9, 10 a locking fixture in accordance with the first exemplary embodiment of the locking fixture, in three different positions during the locking of the guide, FIGS. 11, 12, 13 a second exemplary embodiment of a locking fixture, FIG. 14 a first basic element and FIG. 15 a second basic element.

DETAILED DESCRIPTION OF PREFERRED EMBODIMENTS

FIG. 1 shows an electric machine 1 in a schematic view. The electric machine 1 has a rotor 2 which is arranged so that it can rotate about an axis of rotation R. The rotor 2 has a rotor body 4 which is located around the axis of rotation R (see FIG. 2). The rotor body 4 can here be of solid construction or can consist of plates arranged one behind another in the direction of the axis of rotation R of the rotor 4. In addition, the rotor body 4 can also be constructed in segmented form. The rotor body consists preferably of a magnetically permeable material. Arranged in a stationary position in the interior of the machine 1 is a stator 3, which in FIG. 1 is shown in highly schematic form as a cylinder. For the purpose of generating a magnetic field, the stator 3 has electric coils, which for the sake of clarity, and because they are unimportant for an understanding of the invention, are not shown in FIG. 1. Arranged between the rotor 2 and the stator 3 is a gap 18 which in FIG. 1, for the sake of clarity, is shown wider than in reality. When the machine 1 is operating, the rotor 2 rotates about the stator 3 in the direction of rotation T. In the context of this exemplary embodiment, the electric machine 1 is constructed as a generator for producing electrical power. However, the electrical machine 1 can also be constructed as an electric motor.

In FIGS. 2 and 3 the rotor 2 is shown in schematic form, with FIG. 3 showing a detailed view of the rotor 2 looking in the direction of its axis of rotation R. The rotor 2 has a rotor body 4 which is located around the axis of rotation R, wherein permanent magnets are arranged on the rotor body 4. For the sake of clarity, only the two permanent magnets 5a and 5b have been given reference marks in FIG. 2. It should be noted here that elements in FIG. 3 which are the same as in FIG. 2 have been given the same reference marks.

The rotor body 4 has recesses running in the direction of the axis of rotation R of the rotor 2, of which only the two recesses 7 and 7' have been given reference marks, for the sake of clarity. The recesses are in this case in the peripheral surface, and in the context of the exemplary embodiment they are inset into the internal peripheral surface of the rotor body 4, and preferably take the form of slots. The recesses are arranged around the perimeter of the rotor body 4 and run in the direction of the axis of rotation R. The recesses are constructed in such a way that they form guides on the rotor body 4 which run in the direction of the axis of rotation R of the rotor 2. Here, the recesses have such a shape such that in each case openings 7a and 7b are formed. Taken together, the openings 7a and 7b form a guide, for guiding the permanent magnets and a locking fixture 6. On one side, the permanent magnets have a shape which corresponds to that of the guides, and for the purpose of assembling the rotor these are inserted into the guides in the direction of the axis of rotation R. The guides hold the permanent magnets on the rotor body 4 in a radial direction F (see FIG. 1) and in the direction of the axis of rotation R. After they have been inserted into the guides, they can only be moved, i.e. more precisely stated displaced, in the direction of the axis of rotation R. It is noted that for the sake of clarity the state shown in FIGS. 2 and 3 is that in which, during the assembly of the rotor 2, only one single recess 7' has so far been fitted with permanent magnets. After the assembly of the rotor 2 has been completed, all the recesses are fitted with permanent magnets.

For the purpose of fixing the permanent magnets in the direction of the axis of rotation R of the rotor 2, the rotor 2 has a locking fixture 6 at an axial end region 11 of each guide. Of course, it is not absolutely necessary for a permanent magnet to have a side with a shape which corresponds to that of the guide concerned, but it could for example be mounted on a plate which has a shape corresponding to that of the guide.

The guides hold the locking fixture 6 on the rotor body 4 in the radial direction F and in the direction of rotation T of the rotor 2 and thus in its unlocked state it can only be moved, i.e. more precisely state displaced, in the direction of the axis of rotation R. The locking fixture 6 has on its sides two projections 10a and 10b, which have a shape corresponding to that of the recesses 7a and 7b, so that the locking fixtures can be introduced into the guides. The locking fixtures prevent the permanent magnets, which are held by the guides in the direction of the axis of rotation R and the radial direction F, from moving out of the guides in the direction of the axis of rotation R when the rotor is rotating.

In the locked state, the locking fixtures cannot move in the guides in the direction of the axis of rotation R, and thus they close off the guides and fix the permanent magnets in the direction of the axis of rotation R, so that it is no longer possible for the permanent magnets to emerge from the guides and thereby out of the rotor body 4. The moving element 9 is constructed as a moving element which can be moved from outside, i.e. for example by an operator from outside the locking fixture 6, wherein the locking fixture 6 is constructed in such a way that if there is a movement of the moving element 9 the locking fixture 6 makes a positive or interference fit joint between the locking fixture 6 and the rotor body 4. In the context of the exemplary embodiment, the moving element 9 is constructed as a rotatable rotary element 9 which can be rotated from outside, i.e. for example by an operator from outside the locking fixture 6, wherein the locking fixture 6 is constructed in such a way that if there is a rotational movement of the rotary element 9 the locking fixture 6 makes a positive or interference fit joint between the locking fixture 6 and the rotor body 4. Here, the rotary element is preferably in the form of a screw/bolt.

As shown in FIG. 2 the recesses, and hence the guides, do not run completely through the entire rotor body 4 in the direction of the axis of rotation R, but terminate shortly before the axial end E of the rotor body 4. The material remaining at the axial end E of the rotor body 4 secures the permanent magnets against displacement towards the axial end E in the direction of the axis of rotation R. However, this is not absolutely essential, but the recesses and with them the guides could also run across the entire rotor body 4 in the direction of the axis of rotation R, wherein in this case a locking fixture will be present at each of the two axial end regions of the guides to fix the permanent magnets in the guides. So in this case a locking fixture will be used at each of the two axial end regions of the guide to close off the guide.

FIGS. 4 and 5 show in the form of a schematic diagram a first exemplary embodiment of the locking fixture 6. FIG. 4 shows in schematic form a perspective view of the locking fixture 6 and FIG. 5 shows a view of the locking fixture 6 from the front. Here, elements which are the same in FIGS. 4 and 5 have been given the same reference marks. The locking fixture 6 has a basic body 20, which has two projections 10a and 10b on its sides, which correspond with the shape of the guides. In addition, the locking fixture 6 has a rotary element 9 which, in the context of the exemplary embodiment, is constructed in the form of a screw/bolt. The rotary element 9 is accessible from outside, and can thus be rotated from outside, i.e. for example by an operator from outside the locking fixture 6. In addition, the locking fixture 6 has a displacement element 12 constructed with a wedge shape, which is shown in perspective in FIG. 7, and an interlocking element 13, shown in perspective in FIG. 13, which has on one side an angled surface 21. If the rotary element 9 is rotated, the displacement element 12 is displaced in the axial direction A of the rotary element 9 against the interlocking element 13, so that, as a consequence of the displacement, the displacement element 12 presses against the interlocking element 13, by which means the interlocking element 13 is moved into the opening, arranged in the axial end region 11 of the guides, which runs in the radial direction F of the rotor 2, and in such a way produces a positive joint between the locking fixture 6 and the rotor body 4. When the rotary element 9 is rotated, the interlocking element 13 moves into the opening concerned. For the sake of clarity, only one opening 8 has been given a reference mark in FIG. 2 and in FIG. 8 to FIG. 10.

In FIG. 8, FIG. 9 and FIG. 10, the essential elements of the locking fixture 6 are shown in different states, in the form of a schematic representation. In FIG. 8, the displacement element 12 has not been moved out of the locking fixture 6. In FIG. 9, the displacement element 12 has been moved half way out of the locking fixture 6 and in FIG. 10 the displacement element 12 has been moved completely out of the locking fixture 6. Here, in FIG. 8, FIG. 9 and FIG. 10 the upper diagram in each case shows a detailed perspective view of the rotor body 4. In the illustrations in the center of FIG. 8, FIG. 9 and FIG. 10, on the left the locking fixture 6 is shown in the form of a side view, and on the right, and in the illustration at the very bottom, are shown a side view together with a view from the front of the locking fixture 6, with the basic body 20 not being shown for the sake of clarity.

FIG. 11 to FIG. 13 show, as schematic diagrams, another embodiment of a locking fixture 6' in accordance with the invention. Here, elements in these figures which are the same as in FIG. 1 to FIG. 10 have been given the same reference marks.

FIG. 11 shows a view from above of the locking fixture 6', in FIG. 12 is a view from the front and in FIG. 13 a side view of the locking fixture 6'. This locking fixture 6' has projections 10a' and 10b' on its sides which have a shape corresponding that of the guides. In addition, the locking fixture 6' has a first basic element 16 and a second basic element 14, together with a rotary element 9', which is preferably constructed in the form of a screw/bolt.

A perspective view of the first basic element 16 is shown in FIG. 14 and of the second basic element 14 in FIG. 15.

The rotary element 9 can be accessed from outside, and can thus be rotated from outside, i.e. for example by an operator from outside the locking fixture 6. The locking fixture 6' is constructed in such a way that if there is a rotational movement of the rotary element 9' the first and second basic elements 14 and 16 are pressed against the guide, i.e. against the relevant recess in the rotor body, and in such a way produces an interference fit joint between the locking fixture 6' and the rotor body 4. For this purpose, the second basic element 14 has an angled side face 15, which makes mechanical contact with the first basic element 16, wherein a rotational movement of the rotary element 9' displaces the second basic element 14 in the axial direction A' of the rotary element 9' and it presses against the first basis element 16, so that by this means the first and second basic elements are displaced in opposite senses relative to the direction of rotation T of the rotor, i.e. in opposite directions from each other, U1 and U2 (see FIG. 11) and are pressed against the guide concerned in the rotor body 4. As a consequence of the frictional forces which arise thereby it is no longer possible to displace the locking fixture 6' within the guide in the direction of the axis of rotation R. The locking fixture 6' is thus fixed in its position in the guide.

As shown in FIG. 15, the second basic element 14 has a through hole 17 through which the rotary element 9' passes. The rotary element 9' is in this case preferably constructed as a screw/bolt. The through hole 17 has a cross-section which is elongated longitudinally, so that when the rotary element 9' is rotated the second basic element 14 can move to the right in FIG. 11.

In the context of the exemplary embodiment, the electric machine 1 is constructed as a so-called external rotor, i.e. when the electric machine 1 is in operation the rotor 2 rotates about the stator 3 which is arranged in a stationary position in the center of the machine. In this case, the permanent magnets are arranged on the inner peripheral surface of the rotor body 4. However, the electric machine 1 could also be constructed as a so-called internal-rotor machine, i.e. the stator, which is arranged to be stationary, is arranged around the rotor, which is arranged in the center of the electric machine 1 so that it can rotate. In the case of an embodiment of the electric machine as an internal-rotor machine, the permanent magnets and the guides together with the locking fixtures are arranged on the outer peripheral surface of the rotor body 4.

The invention claimed is:

1. A rotor for an electric machine, comprising:
 a rotor body configured for rotation about an axis and having recesses extending in a direction of the axis and forming guides;
 permanent magnets held by the guides on the rotor body in a radial direction and in a direction of rotation of the rotor body; and
 a plurality of locking fixtures arranged at an axial end region of the guides in one-to-one correspondence and held by the guides on the rotor body in the radial direction and in the direction of rotation, each said locking fixture having a movable moving element which when moved causes the locking fixture to connect with the rotor body by a positive fit or interference fit.

2. The rotor of claim 1, wherein the movable moving element is constructed as a rotatable rotary element which when rotated causes the locking fixture to connect with the rotor body by the positive fit or interference fit.

3. The rotor of claim 2, wherein the rotary element is constructed as a screw or bolt.

4. The rotor of claim 1, wherein the rotor body has in the axial end region of each of the guides an opening which runs in the radial direction, each said locking fixture having an interlocking element which is moved into the opening as the moving element is moved to thereby implement the positive fit.

5. The rotor of claim 4, wherein the locking fixtures have each a displacement element of wedge-shaped configuration, said moving element being constructed as a rotatable rotary element which when rotated causes the displacement element to move in an axial direction of the rotary element against the interlocking element so as to move the interlocking element into the opening.

6. The rotor of claim 1, wherein the locking fixtures have each a first basic element and a second basic element so constructed that a movement of the moving element causes the first and second basic elements to be pressed against the guide to establish the interference fit.

7. The rotor of claim 6, wherein the second basic element has an angled side face in mechanical contact with the first basic element, said moving element being constructed as a rotatable rotary element which when rotated displaces the second basic element in an axial direction of the rotary element and presses the second basic element against the first basic element, thereby moving the first and second basic elements in opposite directions to each other in the direction of rotation of the rotor and pressing the first and second basic elements against the guide.

8. An electric machine, constructed as an electric motor or generator, said electric machine comprising a rotor including a rotor body configured for rotation about an axis and having recesses extending in a direction of the axis and forming guides, permanent magnets held by the guides on the rotor body in a radial direction and in a direction of rotation of the rotor body, and a plurality of locking fixtures arranged at an axial end region of the guides in one-to-one correspondence and held by the guides on the rotor body in the radial direction and in the direction of rotation, each said locking fixture having a movable moving element which when moved causes the locking fixture to connect with the rotor body by a positive fit or interference fit.

9. The electric machine of claim 8, wherein the movable moving element is constructed as a rotatable rotary element which when rotated causes the locking fixture to connect with the rotor body by the positive fit or interference fit.

10. The electric machine of claim 9, wherein the rotary element is constructed as a screw or bolt.

11. The electric machine of claim 8, wherein the rotor body has in the axial end region of each of the guides an opening which runs in the radial direction, each said locking fixture having an interlocking element which is moved into the opening as the moving element is moved to thereby implement the positive fit.

12. The electric machine of claim 11, wherein the locking fixtures have each a displacement element of a wedge-shaped configuration, said movable moving element being constructed as a rotatable rotary element which when rotated causes the displacement element to move in an axial direction of the rotary element against the interlocking element so as to move the interlocking element into the opening.

13. The electric machine of claim 8, wherein the locking fixtures have each a first basic element and a second basic element so constructed that a movement of the moving element causes the first and second basic elements to be pressed against the guide to establish the interference fit.

14. The electric machine of claim 13, wherein the second basic element has an angled side face in mechanical contact with the first basic element, said moving element being constructed as a rotatable rotary element which, when rotated displaces the second basic element in an axial direction of the rotary element and presses the second basic element against the first basic element, thereby moving the first and second basic elements in opposite directions to each other in the direction of rotation of the rotor and pressing the first and second basic elements against the guide.

* * * * *